United States Patent
Bates et al.

(10) Patent No.: US 11,928,864 B2
(45) Date of Patent: Mar. 12, 2024

(54) SYSTEMS AND METHODS FOR 2D TO 3D CONVERSION

(71) Applicant: Worlds Enterprises, Inc., Dallas, TX (US)

(72) Inventors: Ross Bates, Dallas, TX (US); Paul Aarseth, Murphy, TX (US); Ruben Luna, Grapevine, TX (US); Nik Willwerth, Princeton, TX (US)

(73) Assignee: Worlds Enterprises, Inc., Dallas, TX (US)

( * ) Notice: Subject to any disclaimer, the term of this patent is extended or adjusted under 35 U.S.C. 154(b) by 0 days.

(21) Appl. No.: 18/045,353

(22) Filed: Oct. 10, 2022

(65) Prior Publication Data

US 2023/0186556 A1 Jun. 15, 2023

Related U.S. Application Data

(60) Provisional application No. 63/254,412, filed on Oct. 11, 2021.

(51) Int. Cl.
*G06T 15/00* (2011.01)
*G06F 3/04815* (2022.01)
(Continued)

(52) U.S. Cl.
CPC .......... *G06V 20/52* (2022.01); *G06F 3/04815* (2013.01); *G06T 7/20* (2013.01);
(Continued)

(58) Field of Classification Search
CPC ..... G06T 19/00; G06T 15/20; G06T 2210/21; G06V 40/10; G06V 20/41; G06V 20/20; A63F 13/525
(Continued)

(56) References Cited

U.S. PATENT DOCUMENTS 11,354,860 B1 * 6/2022 Deng .................. G06T 19/20
11,551,407 B1 * 1/2023 Stanney ................ A63F 13/525
(Continued)

OTHER PUBLICATIONS

Nguyen P, Quach KG, Duong CN, Le N, Nguyen XB, Luu K. Multi-camera multiple 3d object tracking on the move for autonomous vehicles. InProceedings of the IEEE/CVF Conference on Computer Vision and Pattern Recognition 2022 (pp. 2569-2578).*

(Continued)

*Primary Examiner* — Phu K Nguyen
(74) *Attorney, Agent, or Firm* — Whitaker Chalk Swindle & Schwartz, PLLC; Bradley J. Birchfield

(57) ABSTRACT

According to some embodiments, a method includes accessing a video generated by a first physical camera in a physical environment. The method further includes identifying an object of interest in the video frame that corresponds to a physical object in the physical environment. The method further includes displaying a virtual 3D environment that corresponds to the physical environment. The method further includes configuring a plurality of settings of a first virtual camera to match a plurality of settings of a first physical camera and configuring a plurality of settings of a second virtual camera to match a plurality of settings of a second physical camera. The method further includes projecting the identified object of interest into the virtual 3D environment using the configured first and second virtual cameras.

20 Claims, 9 Drawing Sheets

(51) Int. Cl.
| | |
|---|---|
| *G06T 7/20* | (2017.01) |
| *G06T 7/70* | (2017.01) |
| *G06T 17/00* | (2006.01) |
| *G06T 19/00* | (2011.01) |
| *G06T 19/20* | (2011.01) |
| *G06V 10/74* | (2022.01) |
| *G06V 10/82* | (2022.01) |
| *G06V 20/52* | (2022.01) |
| *G06V 20/64* | (2022.01) |

(52) U.S. Cl.
CPC ............... *G06T 7/70* (2017.01); *G06T 17/00* (2013.01); *G06T 19/006* (2013.01); *G06T 19/20* (2013.01); *G06V 10/761* (2022.01); *G06V 10/82* (2022.01); *G06V 20/64* (2022.01); *G06T 2200/08* (2013.01); *G06T 2200/24* (2013.01); *G06T 2207/10016* (2013.01); *G06T 2207/20084* (2013.01); *G06T 2207/30196* (2013.01); *G06T 2219/2004* (2013.01); *G06V 2201/07* (2022.01)

(58) Field of Classification Search
USPC .......................................................... 345/418
See application file for complete search history.

(56) References Cited

U.S. PATENT DOCUMENTS

| | | | | |
|---|---|---|---|---|
| 11,709,236 | B2* | 7/2023 | Smits | .................... G01S 17/04 |
| | | | | 356/4.01 |
| 2020/0126257 | A1* | 4/2020 | Tauber | .................. G06T 15/205 |
| 2023/0139626 | A1* | 5/2023 | Berliner | .................. G06F 3/165 |
| | | | | 345/156 |

OTHER PUBLICATIONS

Tesfaye YT, Zemene E, Prati A, Pelillo M, Shah M. Multi-target tracking in multiple non-overlapping cameras using fast-constrained dominant sets. International Journal of Computer Vision. Sep. 1, 2019;127:1303-20.*

Singh SP, Jain K, Mandla Vr. 3D scene reconstruction from video camera for virtual 3d city modeling. American Journal of Engineering Research. 2014;3(1):140-8.*

Rahaman H, Champion E, Bekele M. From photo to 3D to mixed reality: A complete workflow for cultural heritage visualisation and experience. Digital Applications in Archaeology and Cultural Heritage. Jun. 1, 2019;13:e00102.*

* cited by examiner

SYSTEMS AND METHODS FOR 2D TO 3D CONVERSION

PRIORITY

This application claims the benefit, under 35 U.S.C. § 119(e), of U.S. Provisional Patent Application No. 63/254,412, filed 11 Oct. 2021, which is incorporated herein by reference in its entirety.

TECHNICAL FIELD

This disclosure generally relates to object tracking, and more specifically to tracking two-dimensional (2D) objects in a three-dimensional (3D) coordinate space.

BACKGROUND

Sensors such as cameras, motion sensors, and biometric sensors are used in many different applications to detect and analyze objects. As an example, a manufacturing facility may utilize multiple security cameras to capture video streams of different locations within the manufacturing facility. The captured video streams may be monitored by security personnel in order to detect the presence and movements of various objects (e.g., people and vehicles) throughout the manufacturing facility. The monitoring of data such as video streams, especially for large facilities with numerous security cameras, typically requires a large amount of manpower. Furthermore, monitoring multiple videos streams at the same time may result in overlooked security events.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Figure 1:
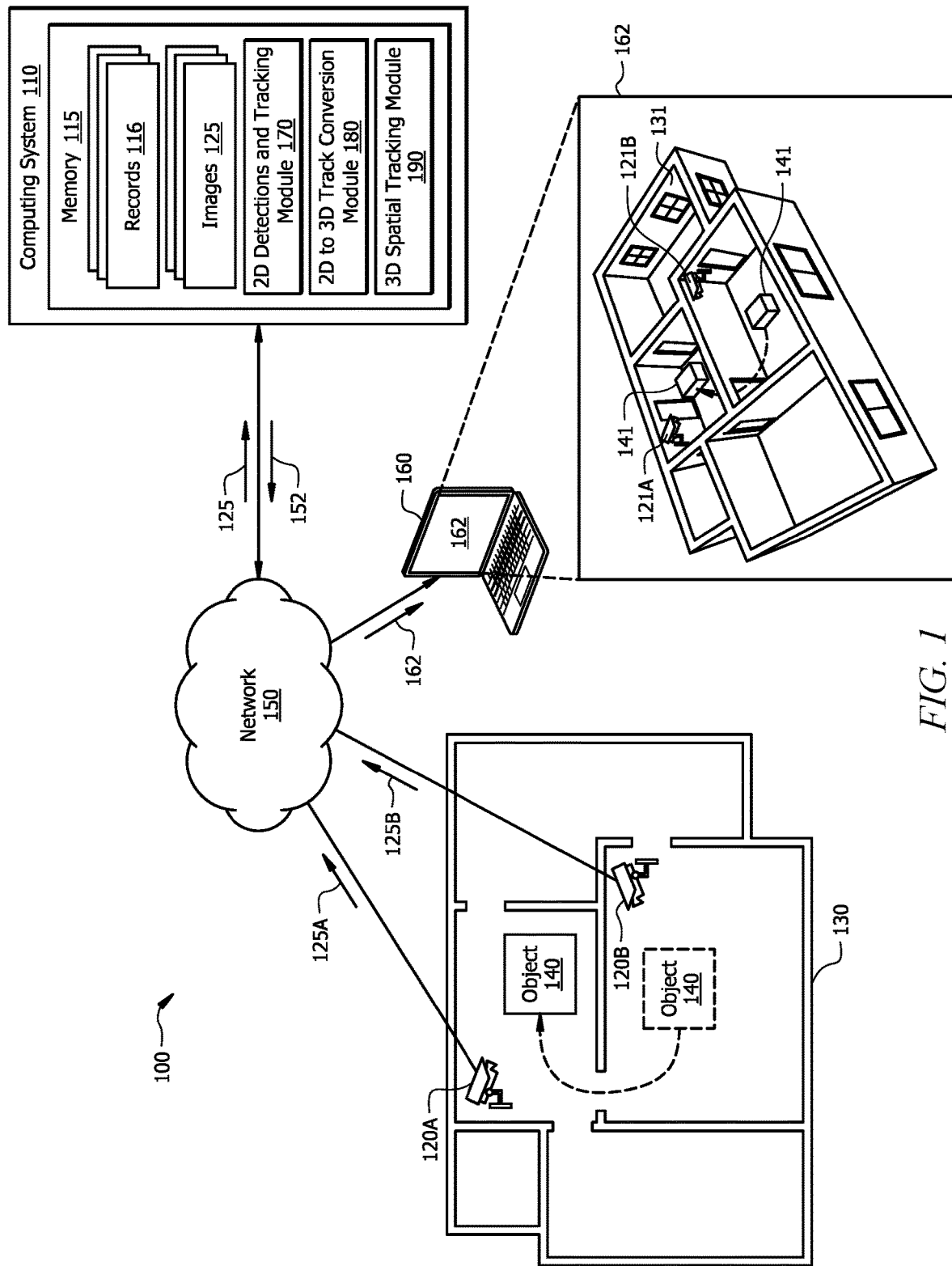
FIG. 1 is a diagram illustrating a 2D-to-3D tracking system, according to particular embodiments.

The present disclosure relates generally to tracking two-dimensional (2D) objects in a three-dimensional (3D) coordinate space. In general, the disclosed systems and methods analyze 2D data from multiple sensors and then translate the 2D data into a real-time visual 3D environment that is displayed in a graphical user interface. Using an example of a manufacturing facility with multiple security cameras, the disclosed embodiments analyze 2D images (e.g., video or image streams) from multiple security cameras in order to detect real-world physical objects within the manufacturing facility. For example, the detected physical objects may be vehicles or people. Once the physical objects have been detected from the 2D data, 3D representations of the physical objects are visually placed within a visual 3D environment in a graphical user interface that corresponds to the manufacturing facility (e.g., a 3D model of the manufacturing facility.) Movements of the detected physical objects in the manufacturing facility are then tracked in the visual 3D environment. In other words, as physical objects such as people move through the manufacturing facility and are captured in images by security cameras, the corresponding 3D representations of the people are visually shown with corresponding movements within the visual 3D environment of the manufacturing facility in the graphical user interface. As a result, a single security team member may be able to monitor a 3D representation of the entire manufacturing facility that is populated with representations of detected real-world objects (e.g., people or vehicles) and that shows movements of the physical objects in real-time (e.g., tracking).

According to some embodiments, a method includes accessing 2D data generated by a plurality of sensors. The plurality of sensors are located within a physical environment. The method further includes identifying, by analyzing the 2D data, a physical object that is physically located within the physical environment. The method further includes displaying, in a graphical user interface, a virtual 3D environment that corresponds to the physical environment. The method further includes displaying a virtual object in the virtual 3D environment. The virtual object is a visual representation of the physical object identified in the 2D data and a location of the virtual object in the virtual 3D environment corresponds to a physical location of the physical object in the physical environment. The method further includes displaying movements of the virtual object in the virtual 3D environment that correspond to movements of the physical object within the physical environment.

According to another embodiment, a method includes accessing a video generated by a camera located within a physical environment. The method further includes identifying, by analyzing a first video frame of the video, a first object of interest in the first video frame. The first object of interest corresponds to a physical object that is physically located within the physical environment. The method further includes storing, in one or more memory units, a record for the first object of interest. The record includes a unique identifier for the first object of interest. The method further includes identifying, by analyzing a second video frame of the video, a second object of interest in the second video frame. The method further includes comparing variables of the first object of interest to variables of the second object of interest. The method further includes determining, based on the comparison, that the variables of the first object of interest match the variables of the second object of interest and in response, assigning the unique identifier for the first object of interest to the second object of interest. The method further includes updating the record to include the second object of interest.

According to another embodiment, a method includes accessing a video generated by a first physical camera located within a physical environment. The method further includes identifying, by analyzing a video frame of the video, an object of interest in the video frame. The object of interest corresponds to a physical object that is physically located within the physical environment. The method further includes displaying, in a graphical user interface, a virtual three-dimensional (3D) environment that corresponds to the physical environment. The virtual 3D environment includes a first virtual camera that corresponds to the first physical camera and a second virtual camera that corresponds to a second physical camera located within the physical environment. The method further includes configuring a plurality of settings of the first virtual camera to match a plurality of settings of the first physical camera. The method further includes configuring a plurality of settings of the second virtual camera to match a plurality of settings of the second physical camera. The method further includes projecting the identified object of interest into the virtual 3D environment using the configured first and second virtual cameras.

According to another embodiment, a method includes accessing a live track list stored in one or more memory units. The live track list includes a plurality of tracks. Each track of the plurality of tracks includes a coordinate of an object of interest captured by a physical sensor located within a physical environment and a unique identification (ID) for the detected object of interest. The method further includes receiving a new track for a new object of interest. The new track includes a coordinate of the new track and a unique ID for the new object of interest. The method further includes comparing the new track to the plurality of tracks of the live track list in order to determine if the new track matches any existing tracks of the plurality of tracks. The method further includes merging the new track with the particular existing track if it is determined that the new track matches a particular existing track in the live track list. The method further includes adding the new track to the live track list if it is determined that the new track does not match any existing tracks in the live track list. The method further includes displaying, in a graphical user interface, a virtual 3D environment that corresponds to the physical environment. The method further includes projecting virtual objects into the virtual 3D environment using the live track list.

Technical advantages of certain embodiments of this disclosure may include one or more of the following. Certain disclosed embodiments provide systems and methods for tracking 2D objects in a 3D coordinate space. Unlike existing solutions where personnel may be required to monitor 2D data from multiple sensors (e.g., monitor multiple video streams from multiple video cameras at the same time), embodiments of this disclosure provide systems and methods that detect real-world physical objects (e.g., people and vehicles) in 2D data such as images from multiple video cameras and then provide real-time tracking of the detected physical objects in a visual 3D model of the environment. By providing real-time tracking of real-world objects in a visual 3D model of the environment, a facility such as a manufacturing facility may be more efficiently and effectively monitored. This may increase the safety of the facility and reduce or eliminate the occurrence of safety and security events at the facility. Furthermore, by providing real-time tracking of real-world objects in a visual 3D model of the environment, network bandwidth and computer resources (e.g., computer memory and processing power) may be optimized or reduced by not having to be reserved for the real-time display of 2D data (e.g., video streams) from multiple sensors (e.g., security cameras). Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Sensors such as cameras, motion sensors, and biometric sensors are used in many different applications to detect and analyze objects. As an example, a manufacturing facility may utilize multiple security cameras to capture video streams of different locations within the manufacturing facility. The captured video streams may be monitored by security personnel in order to detect the presence and movements of various physical objects (e.g., people and vehicles) throughout the manufacturing facility. The data produced by sensors such as security cameras may present several problems. As one example, the monitoring of video streams, especially for large facilities with numerous security cameras, typically requires a large amount of manpower. As a specific example, a large manufacturing facility may utilize hundreds of security cameras to capture videos and images of various strategic locations through the facility. This may require multiple personnel to each monitor video feeds from numerous cameras at the same time. This may result in overlooked real-time security or safety events. Furthermore, if a known security or safety event occurred in the past, personnel may be required to search through hours of video feeds in order to investigate the event. This may result in an undesirable delay in determining the root cause of the event.

To address these and other problems associated with monitoring multiple sensors such as security cameras, the enclosed embodiments provide systems and methods for tracking two-dimensional (2D) objects in a three-dimensional (3D) coordinate space. In general, the disclosed systems and methods analyze 2D data from multiple sensors and then translate the 2D data into a real-time visual 3D environment displayed in a graphical user interface. Using the above example of a manufacturing facility with multiple security cameras, the disclosed embodiments analyze 2D images (e.g., video or image streams) from multiple security cameras in order to detect real-world physical objects within the manufacturing facility. For example, the detected physical objects may be vehicles or people. Once the physical objects have been detected from the 2D data, 3D representations of the physical objects are visually placed within a visual 3D environment in a graphical user interface that corresponds to the manufacturing facility (e.g., a 3D model of the manufacturing facility). Movements of the detected physical objects in the manufacturing facility are then tracked in the visual 3D environment. In other words, as physical objects such as people move through the manufacturing facility and are captured in images by security cameras, the corresponding 3D representations of the people are visually shown with corresponding movements within the visual 3D environment of the manufacturing facility in the graphical user interface. As a result, a single security team member may be able to monitor a 3D representation of the entire manufacturing facility that is populated with representations of detected real-world physical objects (e.g., people or vehicles) and that shows movements of the physical objects in real-time (e.g., tracking). Furthermore, some embodiments allow the creation of trigger zones within the visual 3D environment of the manufacturing facility in the graphical user interface. This may allow a security team member to receive a notification or alert when an object enters, exits, or moves within the trigger zone. As a result, 2D data from sensors such as security cameras may be more efficiently and effectively monitored and analyzed.

FIG. 1 is a network diagram illustrating a 2D-to-3D tracking system 100 for tracking 2D objects in a 3D coordinate space, according to certain embodiments. 2D-to-3D tracking system 100 includes a computing system 110, multiple physical sensors 120 (e.g., 120A-120B) installed within a physical environment 130, a physical object 140 located within physical environment 130, a network 150, and a user device 160. User device 160 and physical sensors 120 are communicatively coupled with computing system 110 using any appropriate wired or wireless communication system or network (e.g., network 150). Physical sensor 120 sends 2D data 125 (e.g., images or video) to computing system 110. User device 160 includes an electronic display that displays a graphical user interface 162. Graphical user interface 162 displays a virtual 3D environment 131 that includes virtual sensors 121 (e.g., 121A-121B) and virtual object 141. Virtual sensor 121 corresponds to physical sensor 120 (e.g., virtual sensor 121A corresponds to virtual sensor 121B, etc.), virtual object 141 corresponds to physical object 140, and virtual 3D environment 131 corresponds to physical environment 130 (e.g., virtual 3D environment 131 is a virtual model of physical environment 130).

In general, 2D-to-3D tracking system 100 analyzes 2D data 125 from multiple sensors 120 and then translates the 2D data 125 into real-time virtual 3D environment 131 that is displayed on graphical user interface 162 of user device 160. Using the example of a physical environment 130 that includes multiple security cameras 120, the disclosed embodiments analyze 2D images 125A-125B (e.g., video or image streams) from security cameras 120A-120B in order to detect physical object 140 within physical environment 130. Once physical object 140 has been detected from 2D data 125, a 3D representation of physical object 140 (i.e., virtual object 141) is visually placed within virtual 3D environment 131 in graphical user interface 162. Movements of the detected physical object 140 in physical environment 130 are then tracked in virtual 3D environment 131. In other words, as physical object 140 physically moves through physical environment 130 and is captured in images 125A-125B by security cameras 120A-120B, the corresponding virtual object 141 is visually shown with corresponding movements within virtual 3D environment 131. As a result, 2D data 125 from sensors 125 such as security cameras may be more efficiently and effectively monitored and analyzed.

Computing system 110 may be any appropriate computing system in any suitable physical form. As example and not by way of limitation, computing system 110 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computing system 110 may include one or more computer systems; be unitary or distributed; span multiple locations; span multiple machines; span multiple data centers; or reside in a cloud, which may include one or more cloud components in one or more networks. Where appropriate, computing system 110 may perform without substantial spatial or temporal limitation one or more steps of one or more methods described or illustrated herein. As an example and not by way of limitation, computing system 110 may perform in real time or in batch mode one or more steps of one or more methods described or illustrated herein. Computing system 110 may perform at different times or at different locations one or more steps of one or more methods described or illustrated herein, where appropriate. A particular example of a computing system 110 is described in reference to FIG. 9.

Computing system 110 includes a 2D detections and tracking module 170, a 2D-to-3D track conversion module 180, and a 3D spatial tracking module 190. Modules 170-190 are utilized by computing system 110 to track physical objects 140 within virtual 3D environment 131, as described herein. Modules 170-190 represent any suitable set of instructions, logic, or code embodied in a computer-readable storage medium. For example, modules 170-190 may be embodied in memory 114, a disk, a CD, or a flash drive. In particular embodiments, modules 170-190 may include instructions (e.g., a software application) executable by processor to perform one or more of the functions described herein. Particular embodiments of 2D detections and tracking module 170 are described in more detail below with respect to FIG. 6. Particular embodiments of 2D-to-3D track conversion module 180 are described in more detail below with respect to FIG. 7. Particular embodiments of 3D spatial tracking module 190 are described in more detail below with respect to FIG. 8.

Physical sensor 120 is any device that is located within physical environment 130 that is capable of generating and electronically sending 2D data 125 to computing system 110. In some embodiments, physical sensor 120 is a security camera that generates and sends images 125 to computing system 110. In other embodiments, physical sensor 120 is a temperature sensor, a biometric sensor, an infrared sensor, a motion sensor, or any other appropriate sensor that is capable of sensing the presence, motion, or physical attributes of physical object 140. For convenience, this disclosure focuses on physical sensor 120 being a security camera, but it should be understood that physical sensor 120 may be any other existing or future physical sensor installed within physical environment 130.

Virtual sensor 121 is representation of physical sensor 120 that is placed within virtual 3D environment 131. For example, if physical sensor 120 is a camera, virtual sensor 121 is a virtual camera. The configuration and operation of particular virtual sensors 121 are discussed in more detail below.

Figure 2:
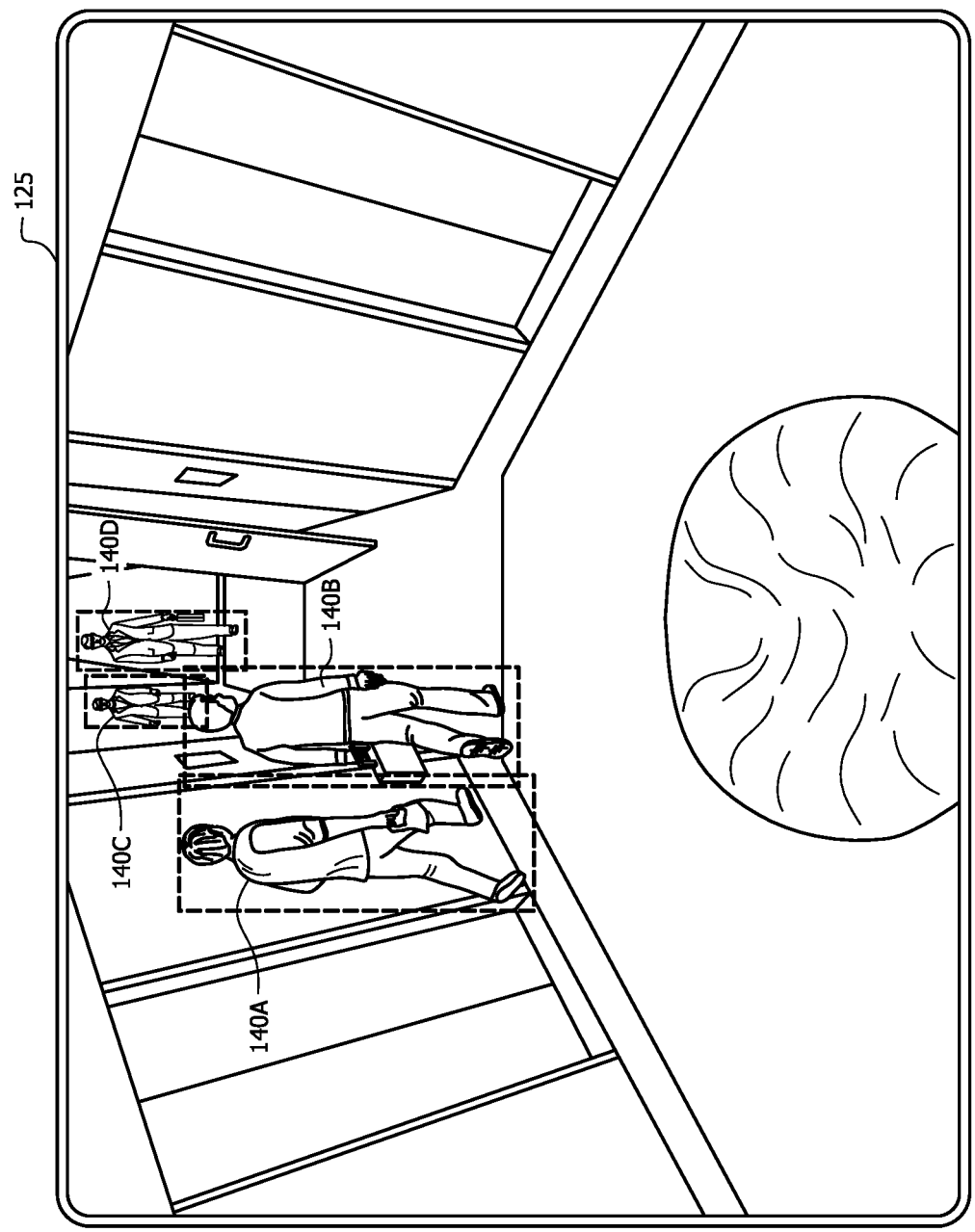
FIG. 2 is an example image captured by the 2D-to-3D tracking system of FIG. 1, according to particular embodiments.

2D data 125 is data that is generated by physical sensor 120 and electronically communicated to computing system 110. As illustrated in FIG. 2, in embodiments where physical sensor 120 is a camera, 2D data 125 may be still images or a video stream (i.e., multiple images per second). In the example of FIG. 2, image 125 is generated by a security camera 120 that is monitoring an elevator bank. In this example, images of multiple physical objects 140 (e.g., people 140A-140D) have been captured within image 125. In other embodiments where sensor 120 is not a camera, 2D data 125 may something other than an image. For example, in embodiments where physical sensor 120 is a temperature sensor, 2D data 125 may include temperatures. In embodiments where physical sensor 120 is a biometric sensor, 2D data 125 may be fingerprint images. In embodiments where physical sensor 120 is an infrared sensor, 2D data 125 may be still infrared images or video streams. In embodiments where physical sensor 120 is a motion sensor, 2D data 125 may be motion data that indicates movement by physical object 140.

Physical environment 130 is any physical real-world space. Examples of physical environment 130 may be a manufacturing facility, a residence, a retail establishment, a professional building, a medical building such as a hospital, an airport, a port, a construction facility, a refinery, a utility station such as an electrical transfer station, and the like. While particular examples of physical environment 130 have been described herein, it should be understood that physical environment 130 may be, without limitation, any indoor or outdoor physical environment, space, or location.

Figure 3:
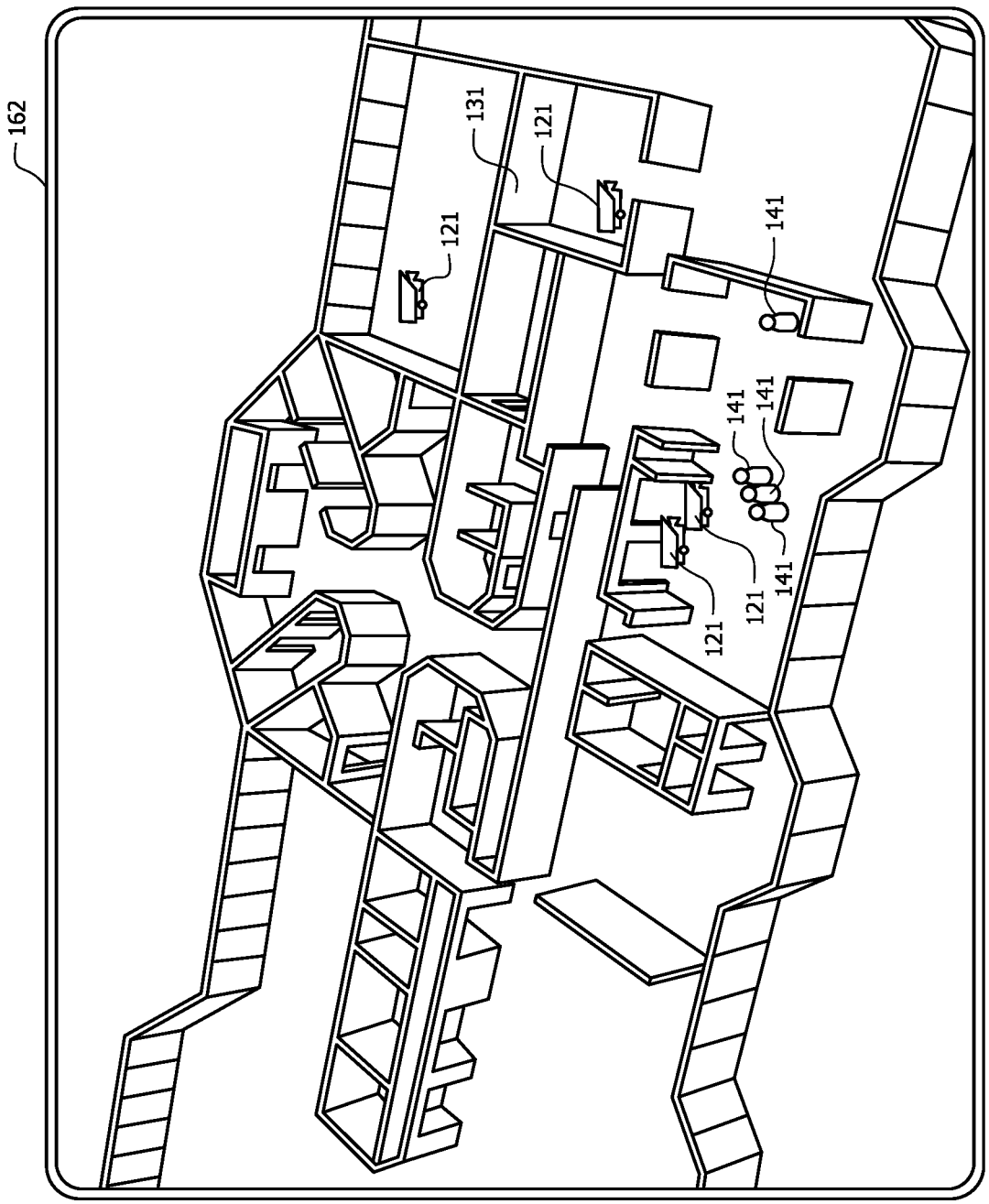
FIG. 3 is an example graphical user interface with a virtual 3D environment that is generated by the 2D-to-3D tracking system of FIG. 1, according to particular embodiments.

Virtual 3D environment 131 is a visual 3D representation of physical environment 130 that is displayed on graphical user interface 162 of user device 160. In general, virtual 3D environment 131 corresponds to physical environment 130. That is, stationary physical objects within physical environment 130 (e.g., walls, floors, ceilings, etc.) have corresponding visual counterparts within virtual 3D environment 131. In some embodiments, virtual 3D environment 131 is a 3D model of physical environment 130. FIG. 3 is an example graphical user interface 162 with an example virtual 3D environment 131 that is generated by 2D-to-3D tracking system 100. In this example, virtual 3D environment 131 is a 3D representation of an office building and includes multiple virtual cameras 121 and multiple virtual objects 141.

Physical object 140 is any real-world object of interest that is located within physical environment 130. In general, physical object 140 is any real-world object that is monitored for presence and movement. Examples of physical object 140 include people, vehicles, and animals. For example, if physical environment 130 is a retail business or residence, physical object 140 may be a person. As another example, if physical environment 130 is a zoo, physical object 140 may be an animal. As yet another example, if physical environment 130 is an airport, physical object 140 may be an airplane.

Virtual object 141 is a visual representation of physical object 140 that is displayed within virtual 3D environment 131. For example, if physical object 140 is a person, virtual object 141 may be an icon or other representation of a person. As another example, if physical object 140 is an automobile, virtual object 141 may be an icon or other representation of an automobile. In other embodiments, virtual object 141 may be any other appropriate visual representation of physical object 140 (e.g., a sphere, a line, etc.).

Network 150 allows communication between and amongst the various components of 2D-to-3D tracking system 100. This disclosure contemplates network 150 being any suitable network operable to facilitate communication between the components of 2D-to-3D tracking system 100. Network 150 may include any interconnecting system capable of transmitting audio, video, signals, data, messages, or any combination of the preceding. Network 150 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network.

User device 160 is any appropriate device for communicating with components of computing system 110 over network 150 (e.g., the internet). For example, user device 160 may be a computing device such as a smartphone, wearable computer glasses, a smartwatch, a tablet computer, a laptop computer, a desktop computer, and the like. User device 160 may include an electronic display, a processor such processor 902, and memory such as memory 904.

In operation, 2D-to-3D tracking system 100 discovers and tracks the location and movements of physical objects 140 within physical environment 130 by analyzing 2D data 125 and then displaying corresponding virtual objects 141 in virtual 3D environment 131 on graphical user interface 162 of user device 160. As physical objects 140 move about within physical environment 130 (e.g., as illustrated with a dashed line in physical environment 130 of FIG. 1), their corresponding virtual objects 141 are displayed with matching movements within virtual 3D environment 131 (e.g., as illustrated with a dashed line in virtual 3D environment 131 of FIG. 1). To provide the tracking of physical objects 140 in virtual 3D environment 131, some embodiments of 2D-to-3D tracking system 100 first receive or otherwise access 2D data 125 that is generated by physical sensors 120. For example, 2D-to-3D tracking system 100 may receive (e.g., periodically or continuously) images 125 from multiple cameras 120 (e.g., 120A and 120B) and then store images 125 in memory 115. 2D-to-3D tracking system 100 may then analyze images 125 in order to identify physical objects 140 that are located within physical environment 130. For example, a neural network architecture may be used to identify depictions of physical objects 140 in images 125. A particular example of 2D-to-3D tracking system 100 identifying people 140A-140D within image 125 is illustrated in FIG. 2. More specific details about identifying and tracking physical object 140 using images 125 is described in more detail below with respect to 2D detections and tracking module 170 and FIG. 6.

In some embodiments, 2D-to-3D tracking system 100 may then display virtual 3D environment 131 in graphical user interface 162 of user device 160. A particular example of virtual 3D environment 131 is illustrated in FIG. 3. Virtual 3D environment 131 generally corresponds to physical environment 130. That is, any walls, floors, ceilings, fixtures, etc. that are physically located in physical environment 130 also appear in virtual 3D environment 131. In some embodiments, virtual 3D environment 131 is created using 3D modeling software and is created to scale with physical environment 130.

In some embodiments, 2D-to-3D tracking system 100 may then display virtual objects 141 in virtual 3D environment 131 that correspond to physical objects 140 detected using images 125. For example, FIG. 3 illustrates multiple virtual objects 141 that each correspond to a particular physical object 140. The locations of virtual objects 141 within virtual 3D environment 131 correspond to the actual physical locations of physical objects 140 in physical environment 130. Furthermore, 2D-to-3D tracking system 100 displays movements of virtual object 141 in virtual 3D environment 131 that correspond to movements of physical objects 140 within physical environment 130. Details regarding the placement and movement of virtual objects 141 within virtual 3D environment 131 are discussed in more detail below in reference to 2D-to-3D track conversion module 180 and 3D spatial tracking module 190.

Figure 4:
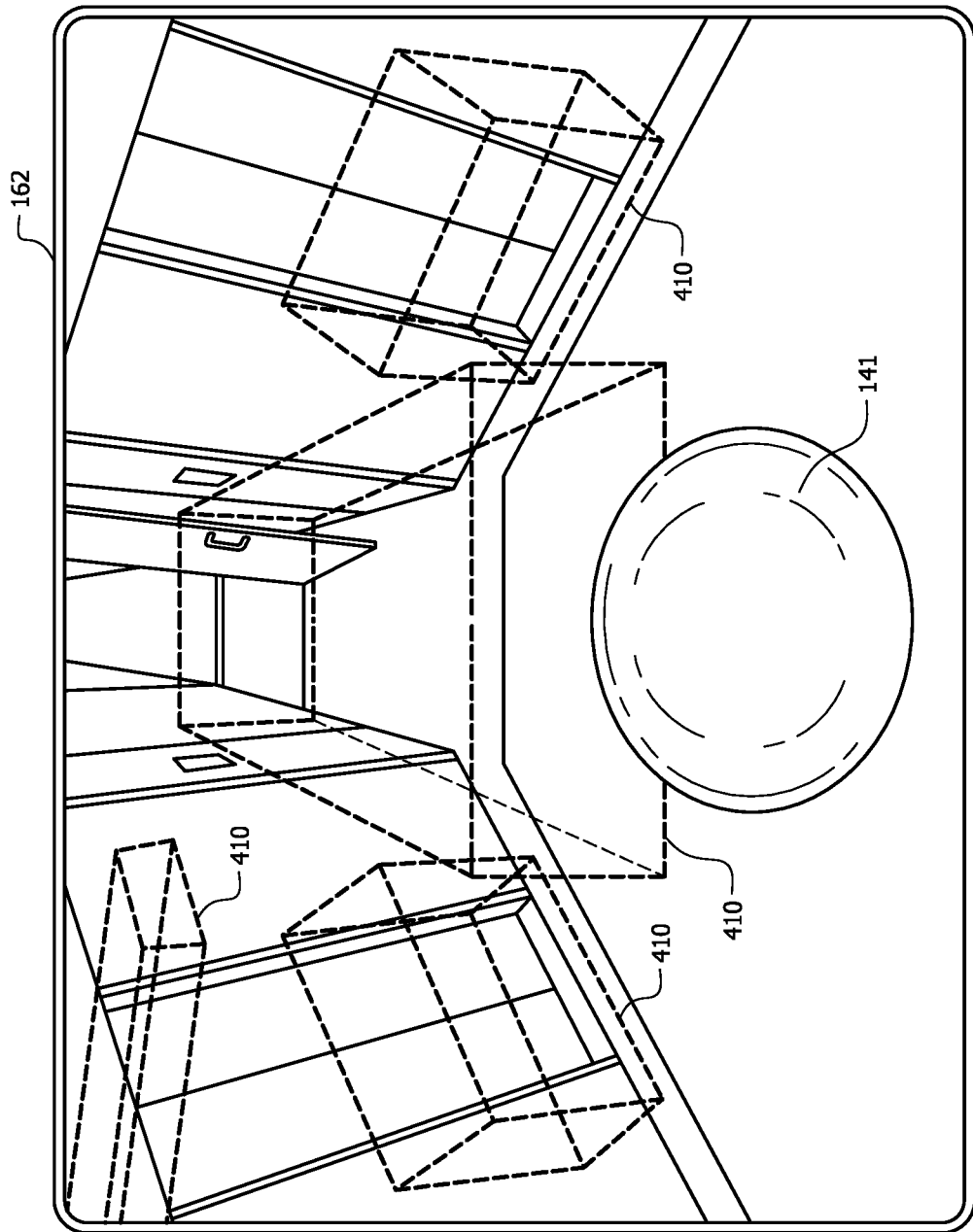
FIG. 4 is an example graphical user interface with trigger zones in a virtual 3D environment, according to particular embodiments.

In some embodiments, 2D-to-3D tracking system 100 provides one or more options in graphical user interface 162 to create trigger zones 410 within virtual 3D environment 131, as illustrated in FIG. 4. Each trigger zone 410 is a 3D area that is monitored for the movement or the presence of virtual objects 141. In some embodiments, an alert (e.g., a text notification, a pop-up notification in graphical user interface 162, etc.) may be displayed to a user (e.g., on user device 160) when a virtual object 141 is detected within a trigger zone 410. As one example, an alert may be provided when any virtual object 141 enters a trigger zone 410. As another example, an alert may be provided when a certain configurable number of ingress detections occur into trigger zone 410. This feature may be especially useful for security personnel who are tasked with monitoring a facility. Trigger zones 410 may be created around strategic locations (e.g., exterior doors) that would then provide an alert to the security personnel when a physical object (e.g., a person) enters the strategic location.

Figure 5:
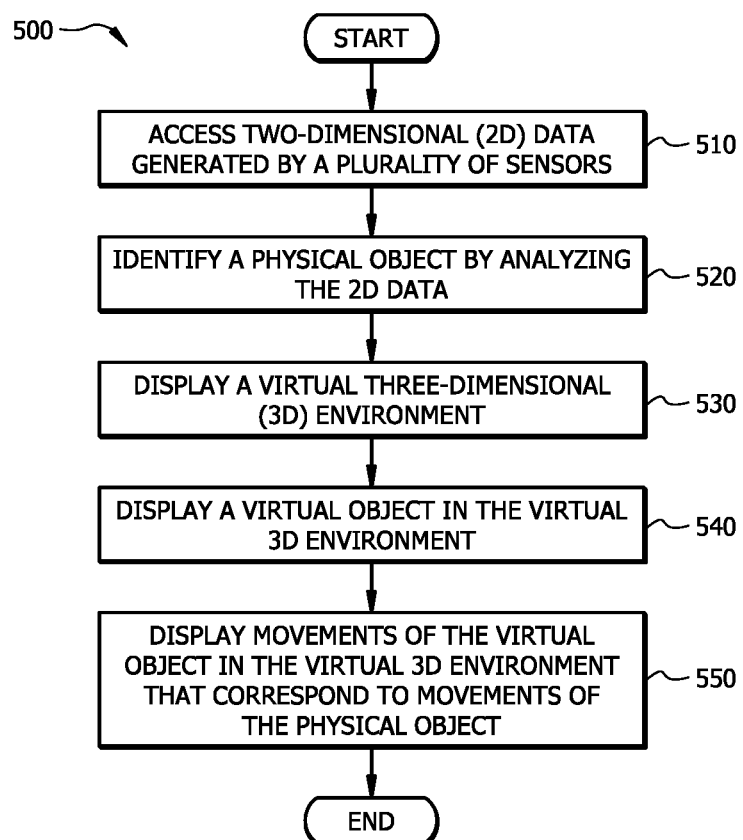
FIG. 5 is a flow diagram illustrating an example method for tracking 2D objects in a 3D coordinate space, according to particular embodiments.

FIG. 5 is a flow diagram illustrating an example method 500 for tracking 2D objects in a 3D coordinate space. In some embodiments, method 500 may be performed by computing system 110. Method 500 may begin in step 510 where method 500 accesses 2D data generated by one or more sensors that are physically located within a physical environment. In some embodiments, the sensors are physical sensors 120 and may be cameras, temperature sensors, infrared sensors, biometric sensors, and the like. In some embodiments, the 2D data of step 510 is 2D data 125 such as images. In some embodiments, the physical environment is physical environment 130.

In step 520, method 500 identifies, by analyzing the 2D data of step 510, a physical object that is physically located within the physical environment. In some embodiments, the physical object is physical object 140. In some embodiments, step 510 is performed by 2D detections and tracking module 170. In some embodiments, step 510 includes utilizing a neural network architecture.

In step 530, method 500 displays, in a graphical user interface, a virtual 3D environment that corresponds to the physical environment. In some embodiments, the graphical user interface is graphical user interface 162. In some embodiments, the virtual 3D environment is virtual 3D environment 131. In some embodiments, the virtual 3D environment is a 3D model of the physical environment.

In step 540, method 500 displays a virtual object in the virtual 3D environment of step 530. In some embodiments, the virtual object is virtual object 141 and is a visual representation of the physical object identified in the 2D data of step 520. The virtual object is displayed at a location in the virtual 3D environment that corresponds to a physical location of the physical object in the physical environment. In some embodiments, the graphical appearance of the virtual object corresponds to the physical object. For example, if the physical object is a person, the virtual object may be in a shape of a person. As another example, if the physical object is an automobile, the virtual object may be in a shape of an automobile.

In step 550, method 500 displays movements of the virtual object in the virtual 3D environment that correspond to movements of the physical object within the physical environment. For example, if a person within the physical environment walks from one room to another room, the virtual object that corresponds to the person will also move between the corresponding rooms of the virtual 3D environment. After step 550, method 500 may end.

In some embodiments, computing system 110 utilizes 2D detections and tracking module 170, 2D-to-3D track conversion module 180, and 3D spatial tracking module 190 to track physical objects 140 within virtual 3D environment 131, as described herein. 2D detections and tracking module 170, 2D-to-3D track conversion module 180, and 3D spatial tracking module 190 are each described in more detail below.

In general, 2D detections and tracking module 170 of computing system 110 analyzes images 125 and detects objects of interest (e.g., physical object 140) within images 125. The 2D coordinates of detected objects of interest that are detected by 2D detections and tracking module 170 are placed into a queue and further processed by 2D-to-3D track conversion module 180 and 3D spatial tracking module 190. In addition, 2D detections and tracking module 170 assigns a globally unique identification (e.g., a track ID) to each discovered object of interest. This enables the tracking of physical objects 140 within virtual 3D environment 131. More details about 2D detections and tracking module 170 are disclosed below.

In some embodiments, 2D detections and tracking module 170 utilizes training models to detect and track physical objects 140 over time within 2D images 125. In some embodiments, the object detection models utilize a neural network architecture. In some embodiments, the neural network architecture is based on a real time object detection algorithm such as YOLO v3, which is designed to identify objects of interest in an image. YOLO v3 uses a variant of Darknet, which has a 53-layer network trained on Imagenet. For the task of detection, some embodiments utilize additional layers (e.g., 53 additional layers) that are stacked onto YOLO, resulting in a 106 layer fully convolutional underlying architecture for YOLO v3. Convolutional neural network architectures assumes that the inputs are images, which allows the ability to encode locality properties into the architecture. The network convolves different learned feature maps (i.e., a small set of pixel activations) across the image and informs the next layer of the network if any of those feature maps were found. There results in an unlimited number of objects which can be classified in a single image.

In some embodiments, the neural net detection architecture of 2D detections and tracking module 170 makes predictions at three scales, which are given by down sampling the dimensions of the input image by 32, 16, and 8, respectively. This allows the network to learn the relevant features of an object regardless of the size of the object in the image.

In some embodiments, the types of physical objects 140 which can be detected by 2D detections and tracking module 170 are user-definable. In such embodiments, a user model may be trained by feeding example images to 2D detections and tracking module 170 that are annotated with rectangular coordinates around desired objects of interest. During the training process, 2D detections and tracking module 170 determines salient features by updating the weights and biases internal to the network based on the ability of the network to correctly classify an object in the image. Such salient feature maps may be learned by 2D detections and tracking module 170 and may resemble parts of a physical object 140 that are recognizable by humans. For example, a training example of a car may have learned network feature maps that identify parts of the car such as wheels, lights, windshield, mirrors, and the like.

In some embodiments, the feature maps internal to the model are stored by 2D detections and tracking module 170 as a vector of weights. Each layer in the model may be a weighted combination of the inputs of the previous layers. For example, in a car detection model, the internal feature maps that detect smaller components of a car such as wheels, lights, and windshields are passed to the next layer that combines those detections. In turn, the next layer may have its own output of a car since the smaller part detections were found.

At the end of the model, a vector may be produced by 2D detections and tracking module 170 that stores the confidence associated with each end class that the model was trained to detect (e.g., a car, a person, a bicycle, etc.). The class with the highest confidence score may then be used to classify the image detection. In some embodiments, the confidence score is used not only to determine the type of class from the other types of classes the model is trained to determine, but also how confident the model is that what it determined is actually what it is. For example, a traffic sign from far away may resemble a person since it is roughly the same height. In this scenario, 2D detections and tracking module 170 may determine that "person" is the best class to assign to the detection but proceed to assign the detection a low confidence score since it only slightly resembles a person.

After detecting physical objects 140 within images 125, 2D detections and tracking module 170 converts the detections into "tracks" which represent movement of physical objects 140 over time. To convert image detections into tracks, 2D detections and tracking module 170 may extract image frames in parallel from images 125 and feed the image frames into a detection network where each frame is assigned a timestamp (e.g., a value represented in milliseconds that marks the frame time such as 1615319203392). The timestamp, in general, may be used by certain embodiments used to order detections of the same physical object 140 over time into an object track.

In some embodiments, when 2D detections and tracking module 170 finds a match for a target class in an image 125, 2D detections and tracking module 170 creates a new record 116 that is stored in memory 115. In some embodiments, each record 116 of:
- a type identifier (e.g., "person," "automobile," "animal," etc.)
- 2D coordinates (X,Y) of the anchor point for the detection which is calculated using the min Y value and median X value of the box detections
- a globally unique identifier for the object (e.g., "dbd6c3dd-c48a-4615-bd03-7a7042aa6563")

In some embodiments, as each image frame of images 125 is processed by the neural network of 2D detections and tracking module 170, the detections may be evaluated using a predetermined confidence threshold. The confidence value for a detection, in general, indicates how sure the model is that the correct detection label has been applied. In some embodiments, the confidence threshold may be calculated using the training set by mathematically determining the threshold value that correctly classifies the most detections in the test set while removing false positives. The threshold determines if the detection should be kept for tracking or otherwise be discarded as a low-confidence detection. In some embodiments, detections that have a confidence score that exceeds the predetermined confidence threshold are compared against existing live tracks. For example, certain embodiments compare variables of detections such as at the proximity to each existing live track, the velocity and direction of each live track as compared to a new detection, and the type of the detection in each live track. Detections that match using the variables of the proximity, velocity, and type across frames may then be added to that existing track collection and assigned the same object identifier.

In some embodiments, a live track has a variable time to live (e.g., three seconds) in which the tracker of 2D detections and tracking module 170 continues to attempt to add new detections of the same type to the live track. If no detections are added to a track in this timeframe, then the track may be allowed to terminate. At this point, the track is passed to a spatial queue based on the global coordinates of the device (e.g. a camera) used for detection. The spatial queues are used in 2D-to-3D tracking system 100 so that detections in the same geographic area by different physical sensors 120 (e.g., cameras or other sensors such as GPS) are all sent to the same 3D tracker to be aggregated.

In some embodiments, the spatial queues are dynamically sized based on detection volume and are bounded by any 3D polygon representing a physical boundary. For example, the physical boundary may be a room on the 18th floor of a building represented by a 3D cube, or 3000 sq. meters of ocean from 20 meters depth to 40 meters of depth. These are examples of a 3D processing queue that accepts tracks from a source that originates within the boundary. Spatial queues are used so that all detections from physical sensors 120 that are in the same spatial area will send their detections to the same queue so that the 3D tracker (described below) will have all the information available in that spatial area.

Figure 6:
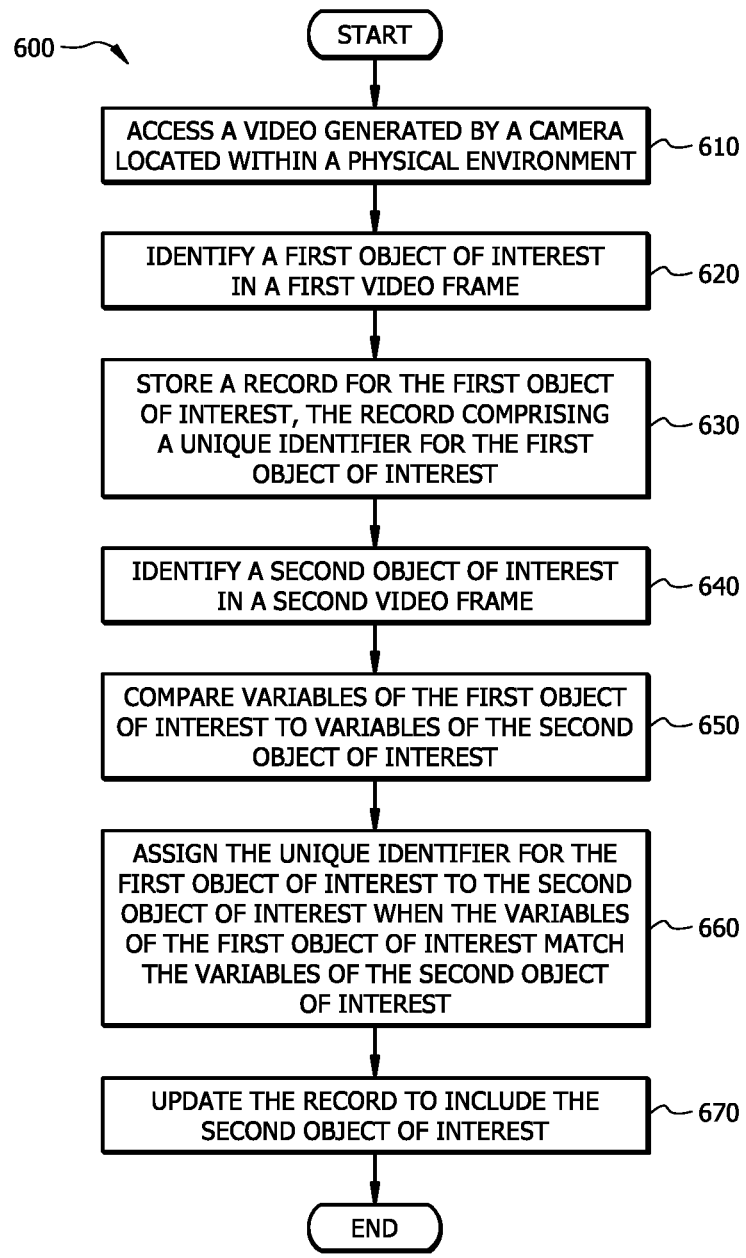
FIG. 6 is a flow diagram illustrating an example method for 2D detections and tracking, according to particular embodiments.

FIG. 6 is a flow diagram illustrating an example method 600 for 2D detections and tracking. In general, method 600 may be performed by 2D detections and tracking module 170 of computing system 110 in order to analyze images 125 and detect objects of interest (e.g., physical objects 140) within images 125. Method 600 begins in step 610 where method 600 accesses a video generated by a camera located within a physical environment. In some embodiments, the video is images 125. In some embodiments, the physical environment is physical environment 130.

In step 620, method 600 identifies, by analyzing a first video frame of the video of step 610, a first object of interest in the first video frame. The first object of interest corresponds to (e.g., is an image or depiction of) a physical object that is physically located within the physical environment. In some embodiments, the physical object is physical object 140. In some embodiments, step 620 includes utilizing a convolution neural network architecture. In some embodiments, step 620 includes identifying an object type for the first object of interest (e.g., a "person" or an "automobile").

In step 630, method 600 stores, in the one or more memory units, a record for the first object of interest. The record includes a unique identifier for the first object of interest. In some embodiments, the record is record 116 and is stored in memory 115.

In step 640, method 600 identifies, by analyzing a second video frame of the video, a second object of interest in the second video frame. In some embodiments, step 640 includes utilizing a convolution neural network architecture. In some embodiments, step 640 includes identifying an object type for the first object of interest (e.g., a "person" or an "automobile").

In step 650, method 600 compares variables of the first object of interest of step 620 to variables of the second object of interest of step 640. This step is generally for determining whether the first object of interest corresponds to the same physical object in the physical environment as the second object of interest. In some embodiments, the variables of the first and second objects of interest includes a proximity, a velocity, and an object type. In some embodiments, the variables of the first object of interest are determined to match the variables of the second object of interest when the object type of the second object of interest matches the object type of the first object of interest, the second object of interest is determined to be within a predetermined distance of the first object of interest, and the velocity of the second object of interest is determined to be within a predetermined amount of the velocity of the first object of interest.

In step 660, method 600 assigns the unique identifier for the first object of interest to the second object of interest when it is determined in step 650 that the variables of the first object of interest match the variables of the second object of interest. In step 670, method 600 update the record of step 630 to include the second object of interest. In this way, the first and second objects of interest are linked to the same physical object and movement of the physical object can be displayed within virtual 3D environment 131. After step 670, method 600 may end.

In some embodiments, method 600 may include additional optional steps. For example, method 600 may display, in a graphical user interface such as graphical user interface 162, a virtual 3D environment that corresponds to the physical environment. In some embodiments, the virtual 3D environment is virtual 3D environment 131. Method 600 may also display a first virtual object in the virtual 3D environment that corresponds to the first object of interest. Method 600 may additionally display a second virtual object in the virtual 3D environment that corresponds to the second object of interest. The display of the first and second virtual objects within the virtual 3D environment indicates movement of the physical object within the physical environment (e.g., tracking of the physical object).

After 2D detections and tracking module 170 creates 2D tracks from detections of physical objects 140 in images 125, the tracks are processed by 2D-to-3D track conversion module 180. In general, 2D-to-3D track conversion module 180 of computing system 110 projects images from physical cameras 120 into virtual 3D environment 131. To do so, 2D-to-3D track conversion module 180 configures synthetic (i.e., virtual) copies of physical cameras 120 within virtual 3D environment 131, creates depth maps for each synthetic camera, and then uses the depth maps for converting 2D coordinates of detections into locations for displaying virtual object 141 within virtual 3D environment 131. More details about 2D-to-3D track conversion module 180 are disclosed below.

In some embodiments, 2D-to-3D track conversion module 180 first creates a 3D virtual representation (e.g., virtual 3D environment 131) of the physical space within physical environment 130 that a camera 120 or array of cameras 120 are able to capture in their respective fields of view. For example, virtual 3D environment 131 may be created using 3D modeling software that is created to scale with the physical space of physical environment 130. The virtual 3D environment 131 represents all planes and boundaries within the field of view of cameras 120 such as walls, floors, doors, fixtures, and the like. In general, anything that camera 120 can see in physical environment 130 should be modeled in virtual 3D environment 131.

Next, 2D-to-3D track conversion module 180 places a virtual sensor 121 (i.e., a "synthetic camera"—a virtual copy of the physical camera 120) in virtual 3D environment 131 at the exact latitude, longitude, and altitude that the corresponding physical camera 120 is positioned in physical environment 130. Furthermore, virtual sensor 121 is modeled using the same parameters from the actual physical camera 120 (e.g., surge, sway, heave, roll, pitch, and yaw). Because the position (e.g., latitude, longitude, and altitude) and parameters (e.g., surge, sway, heave, roll, pitch, and yaw) are equivalent to that of the physical camera 120, the field of view of the virtual sensor 121 in virtual 3D environment 131 is identical to the field of view of the physical camera 120. As a result, every pixel in the physical camera 120 that is imported into the virtual sensor 121 sees the same points in the virtual and physical environments.

In some embodiments, the parameters of physical cameras 120 are collected during setup and stored in a calibrations database as the translation vectors and the rotation vectors representing the physical sensor. Examples of a translation vector and a rotation vector are shown below:

translation_vector: {"type":"Point","coordinates": [−1,0, 2.7]} rotation_vector: {"type":"Point","coordinates": [94,0,0]}

The translation_vector and rotation_vector represent the distance (e.g., in meters) from an origin point. The origin point may be represented as [0,0,0] in the simulated model and may translate directly to a fixed value in the global coordinate system.

In some embodiments, virtual sensors 121 are also configured with the values for the Intrinsic Matrix and Distortion Coefficients of the physical device. The intrinsic values collected for the camera may consist of the following values:

Focal Length, fx, fy

Principal Point Offset, x0, y0

Axis Skew, s

Example Record:

[[832.659176429214, 0, 655.5289703144686],

[0, 832.281248527076, 323.894690766822],

[0, 0, 1]]

In some embodiments, the Distortion Coefficient matrix consists of the radial and tangential distortions of the physical camera lens. The radial distortion coefficient represents the shape of the lens of the camera 120 in the physical world (e.g., flat, barrel, pinhole). The tangential distortion represents the angle that the lens is oriented on a plane in relation to the camera sensor. In some embodiments, these values are calculated from the camera 120 using a checkerboard to be stored as part of the configuration values for the corresponding virtual sensor 121. An example of these settings are as follows:

[−0.4149084446715096, 0.2086551888288715, −0.00003528849002607841, 0.0004587891186248524, −0.05381374423595315]

Using the configuration values for each virtual sensor 121, a simulation is created which creates an instance of each camera loaded in the virtual model that contains the planes within the camera's field of view.

Next, 2D-to-3D track conversion module 180 creates a synthetic depth map for each pixel in the field of view of the virtual camera. Each synthetic depth map creates a one-to-one mapping between each 2D pixel created by camera 120 and the space it represents in the global coordinate system. The values of the depth map are calculated by generating a vector that travels the path from the virtual sensor 121 through each virtual pixel and collides with a plane in virtual 3D environment 131. The value represents the distance (e.g., in meters) between the image sensor and the known planes. This value is stored in a depth map, which may be referred to as a pre-compute file. The pre-compute file provide all potential reference values for the 2D detections being processed in the spatial queue. This step establishes the global camera matrix (i.e., a matrix that includes the pre-compute files for all virtual cameras in virtual 3D environment 131). The global matrix enables each 2D physical camera to be aware of all other camera's field of view detection capabilities using a shared unified coordinate system. The depth map created for each camera overlaps in global space such that each camera's virtual lens shares the same virtual space. This occurs whether or not the field of views overlap. The global camera matrix is used for processing spatial data bounded by the same location defined by the spatial queue.

After virtual 3D environment 131 is built and the synthetic cameras (i.e., virtual sensors 121) are placed with the correct intrinsic parameters, the synthetic cameras are paired with their corresponding physical camera. The images from the physical camera are then projected by 2D-to-3D track conversion module 180 into the virtual scene. When a physical object 140 is detected in the physical camera, the bottom middle pixel of that object may be determined as a 2D (X,Y) coordinate. For example, a bottom middle pixel of the box of physical object 140A in FIG. 2 may be used as the 2D coordinate. The determined 2D coordinate in 2D pixel space is then used to look up the real-world coordinate from the pre-computed camera matrix. For all 2D pixel coordinates in an image, 2D-to-3D track conversion module 180 has already computed the place that that pixel lands on in the virtual ground plane in virtual 3D environment 131. Furthermore, since virtual 3D environment 131 is a 3D model of the physical environment 130, the exact geographic location of that point is straightforward to compute. An example of a pre-computed camera lookup table is shown below.

| X Pixel | Y Pixel | Lat | Lon |
|---|---|---|---|
| ... | ... | ... | ... |
| 200 | 400 | 32.93326207147941 | −96.81597048163489 |
| 200 | 425 | 32.93295137505123 | −96.81573408620443 |
| 200 | 450 | 32.93284061569434 | −96.81564977955809 |
| 200 | 475 | 32.93278876137898 | −96.81561076000627 |
| 200 | 500 | 32.93275566087415 | −96.81558581020263 |
| 200 | 525 | 32.93273385262845 | −96.81556965224122 |
| 200 | 550 | 32.93271763022861 | −96.81555735369302 |
| 200 | 575 | 32.93266107938087 | −96.81554215197973 |
| 200 | 600 | 32.93269658714861 | −96.81554194566549 |
| 200 | 625 | 32.93265695121481 | −96.81553235498612 |
| 200 | 650 | 32.93268266479715 | −96.81553181192749 |
| 200 | 675 | 32.932677273329084 | −96.8155279780911 |
| 200 | 700 | 32.932672655719365 | −96.81552478482055 |

Figure 7:
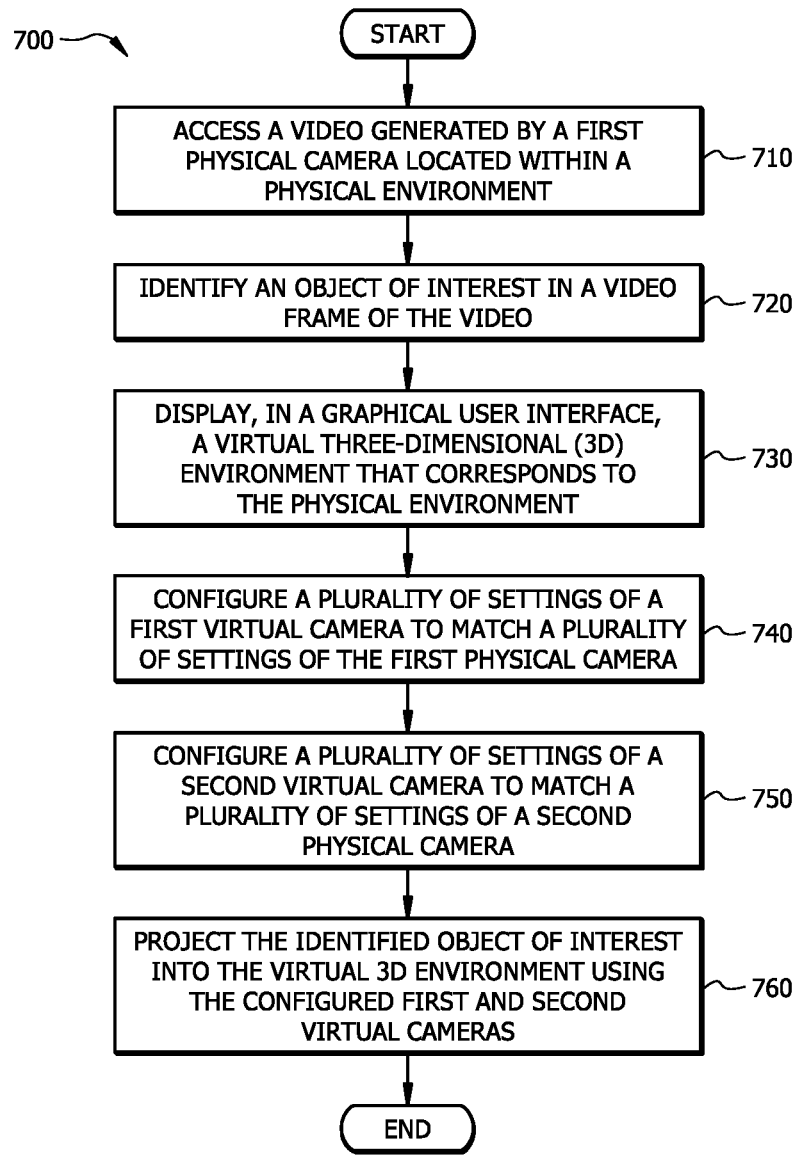
FIG. 7 is a flow diagram illustrating an example method for 2D-to-3D track conversion, according to particular embodiments.

FIG. 7 is a flow diagram illustrating an example method 700 for 2D-to-3D track conversion. In general, method 700 may be performed by 2D-to-3D track conversion module 180 of computing system 110 in order to convert detected objects of interest (e.g., physical objects 140) within images 125 into virtual objects 141. Method 700 begins in step 710 where method 700 accesses a video generated by a first physical camera located within a physical environment. In some embodiments, the video is images 125. In some embodiments, the physical environment is physical environment 130 and the first physical camera is physical sensor 120.

In step 720, method 700 identifies, by analyzing a video frame of the video of step 710, an object of interest in the video frame. The object of interest corresponds to a physical object that is physically located within the physical environment. In some embodiments, the physical object is physical object 140 and the physical environment is physical environment 130. In some embodiments, step 720 includes utilizing a convolution neural network architecture as described above.

In step 730, method 700 displays, in a graphical user interface, a virtual 3D environment that corresponds to the physical environment. In some embodiments, the graphical user interface is graphical user interface 162 and the virtual 3D environment is virtual 3D environment 131 that is displayed on user device 160. The virtual 3D environment includes a first virtual camera (e.g., virtual sensor 121A) that corresponds to the first physical camera (e.g., physical sensor 120A). The virtual 3D environment further includes a second virtual camera (e.g., virtual sensor 121B) that corresponds to a second physical camera (e.g., physical sensor 120B) located within the physical environment. In some embodiments, the first virtual camera is placed in the virtual 3D environment at a same latitude, longitude, and altitude as the first physical camera is positioned in the physical environment. In some embodiments, the second virtual camera is placed in the virtual 3D environment at a same latitude, longitude, and altitude as the second physical camera is positioned in the physical environment.

In step 740, method 700 configures a plurality of settings of the first virtual camera to match a plurality of settings of the first physical camera. In step 750, method 700 configures a plurality of settings of the second virtual camera to match a plurality of settings of the second physical camera. In some embodiments, the settings of steps 740 and 750 include a surge setting, a sway setting, a heave setting, a roll setting, a pitch setting, and a yaw setting. In some embodiments, the settings of steps 740 and 750 further include a radial distortion and a tangential distortion.

In step 760, method 700 projects the identified object of interest into the virtual 3D environment using the configured first and second virtual cameras. In some embodiments, step 760 further includes creating a first synthetic depth map for the first virtual camera and creating a second synthetic depth map for the second virtual camera. The first synthetic depth map provides a one-to-one mapping of each 2D pixel created by the first physical camera and a corresponding space of the first virtual camera in the virtual 3D environment. The second synthetic depth map provides a one-to-one mapping of each 2D pixel created by the second physical camera and a corresponding space of the second virtual camera in the virtual 3D environment. Step 760 may further include creating a camera matrix that includes the first and second synthetic depth maps, determining a 2D coordinate of the identified object of interest (e.g., a 2D coordinate of a bottom middle pixel of an identified object), and then converting the 2D coordinate to a location within the virtual 3D environment using the camera matrix. After step 760, method 700 may end.

After 2D-to-3D track conversion module 180 creates 3D tracks from the 2D tracks detected by 2D detections and tracking module 170, the 3D tracks are processed by 3D spatial tracking module 190. In general, 3D spatial tracking module 190 of computing system 110 fuses all of the detections from all the cameras and devices in a spatial area. To do so, 3D spatial tracking module 190 compares new detections of objects of interest to a live track list. If the new detection matches parameters of existing tracks of the live track list (e.g., matches position, velocity, and appearance), the new detection is merged with the matching track. Otherwise, the new detection is added to the live track list. The live track list is then utilized to display virtual objects 141 in virtual 3D environment 131. More details about 3D spatial tracking module 190 are disclosed below.

In some embodiments, frames of images 125 are pulled from a queue in the order which they were received (e.g., using time stamps). 2D (X,Y) coordinates for a frame are then processed and converted to 3D (X,Y,Z) coordinates using the precompute file generated by the synthetic camera. This is performed by certain embodiments using a lookup function for the detection coordinates as described in reference to 2D-to-3D track conversion module 180. The detections maintain the time of the frame capture (e.g., in milliseconds) which may be used in subsequent steps to align sensors across time.

3D spatial tracking module 190 may then begin receiving frames from multiple cameras 120 and other physical sensors 120 (e.g., GPS devices). When a frame with detections arrives at 3D spatial tracking module 190, the 3D (X,Y,Z) coordinates global coordinate for each unique detected object are saved in a data structure with the timestamp of each detection in each frame. This data structure may be referred to as a live track list. The spatial tracker is responsible for fusing all of the detections from all the cameras and devices in a spatial area. For example, if an automobile is detected by a camera 120, that automobile will be assigned a unique ID (e.g., by the camera 120) that will be the same for all detections of the same automobile in the camera 120. This unique ID is passed to the spatial tracker and used in its live track list (i.e., the object tracker data structure) which includes all detections with the same unique ID along with each accompanying timestamp.

In some embodiments, 3D spatial tracking module 190 makes predictions about where a moving object could be based on the previous movements of the object. The predictions may then be stored as metadata in each live track list. In some embodiments, the last several known object points may be used to determine a velocity and direction of the object. Using the average velocity of the object and the direction 3D spatial tracking module 190 may extrapolate the position of the object for any period of time in the future. This is useful for two situations known as object merge and object match, which are described in more detail below.

An object merge occurs when a unique physical object is detected in two or more cameras 120 or physical sensors 120 at the same location. When physical cameras 120 are calibrated correctly (as described above), multiple different cameras 120 will convert their 2D coordinates to the same 3D global coordinates. When this occurs, the first unique ID to make it to 3D spatial tracking module 190 will establish the live track list of record. The subsequent object detections from the other cameras 120 will then be merged with the existing live track list record since the current known location will be within a set tolerance of the first detection that established the live track. When this occurs, the merge function will associate all unique 2D IDs to the live track so that at any point in time the 3D global coordinate of the object will be calculated as the average of the 3D global coordinates determined for each camera 120 using its calibration and precompute file. This tends to give the virtual representation of the object in the system a more exact location as compared to the real location.

An object match may occur when a missed object detection happens in a 2D camera 120 for a period of time such that the 2D tracker mistakenly determines that the same object moving through its frame is two different objects. In this case, 2D detections and tracking module 170 may assign two different unique IDs to each section of movement through the camera 120. This can happen, for example, if a person is walking from left to right but is occluded by another person or a structure in the frame and emerges in the right side of the frame. An object match will occur in 3D spatial tracking module 190 when a new object starts in a frame and that new object can be reasonably fused with an existing live track. An example of a reasonable constraint may be that the predicted location of an existing live track and the newly received track are within a set distance. This distance is a parameter of the 3D spatial tracking module 190 and may be adjusted based on the type of scene a physical sensor 120 is monitoring. Another example of a reasonable constraint may be that the velocity of the predicted object and the newly received object are also within a set tolerance. This value may be adjustable based on object type, in some embodiments. An object match used global position information that is not available to the 2D tracker to fuse together object tracks in motion that are actually a single unique object. When this occurs, the live track list may be updated to absorb the new track into the existing track and continue as the unique track that it is.

A second form of object match may occur when a unique physical object moves out of the view of one physical sensor 120 and into the view of a different physical sensor 120. Since the different physical sensors 120 only know about the objects in their field of view, the same physical object will be assigned a new ID in the second camera. Similar to the single camera match, the live track will have a predicted location based on last velocity and direction. If the same physical object is moving in a similar trajectory or could plausibly move from one camera location to the other camera location in the time from the last detection in the first camera to the first detection in the second camera, then the object is considered for an object match. In this case, if the object was moving in a straight line and the live track prediction puts the object at the exact location when detected in the second camera, the object may be matched and the live track and new detection will be fused (similarly to the above case where a match happens in a single camera). In the case where an object could plausibly move to the location where it was detected in a second camera (e.g., walking around a corner), another similarity metric may be found, such as reasonable match in appearance. In some embodiments, this is done by matching a color histogram of the two objects.

In some embodiments, 3D spatial tracking module 190 may perform the following method. First, 3D spatial tracking module 190 may convert a detection from 2D pixel coordinate space to 3D coordinates using the generated precomputed translation. Next, 3D spatial tracking module 190 may use the unique object ID of the detection to check if the detection is already in the live track list. If the unique ID of the detected object is not in the live track list, then 3D spatial tracking module 190 may check the 3D position of the detection with extrapolated 3D positions and velocities from tracks in the live track list. If the current 3D position matches a projected 3D position and velocity from the live track list, then 3D spatial tracking module 190 may perform an object similarity using an appearance vector. If the new unique detection matches position, velocity, and appearance, then the detected object may be matched with a previous 3D track in the live track list to be continued. If the current 3D position does not match position, velocity, or appearance of any track in the live track list, then 3D spatial tracking module 190 creates a new 3D track and adds it to the live track list. If there are two tracks from different cameras 120 that occupy the same 3D location, have the same 3D velocity, and match appearance, those two tracks may be merged by 3D spatial tracking module 190 because they are the same object. In some embodiments, tracks in the live track list have a lifespan that is commensurate with the task.

In these embodiments, once the live track lifespan has expired, 3D spatial tracking module 190 may remove the track from the live track list.

Figure 8:
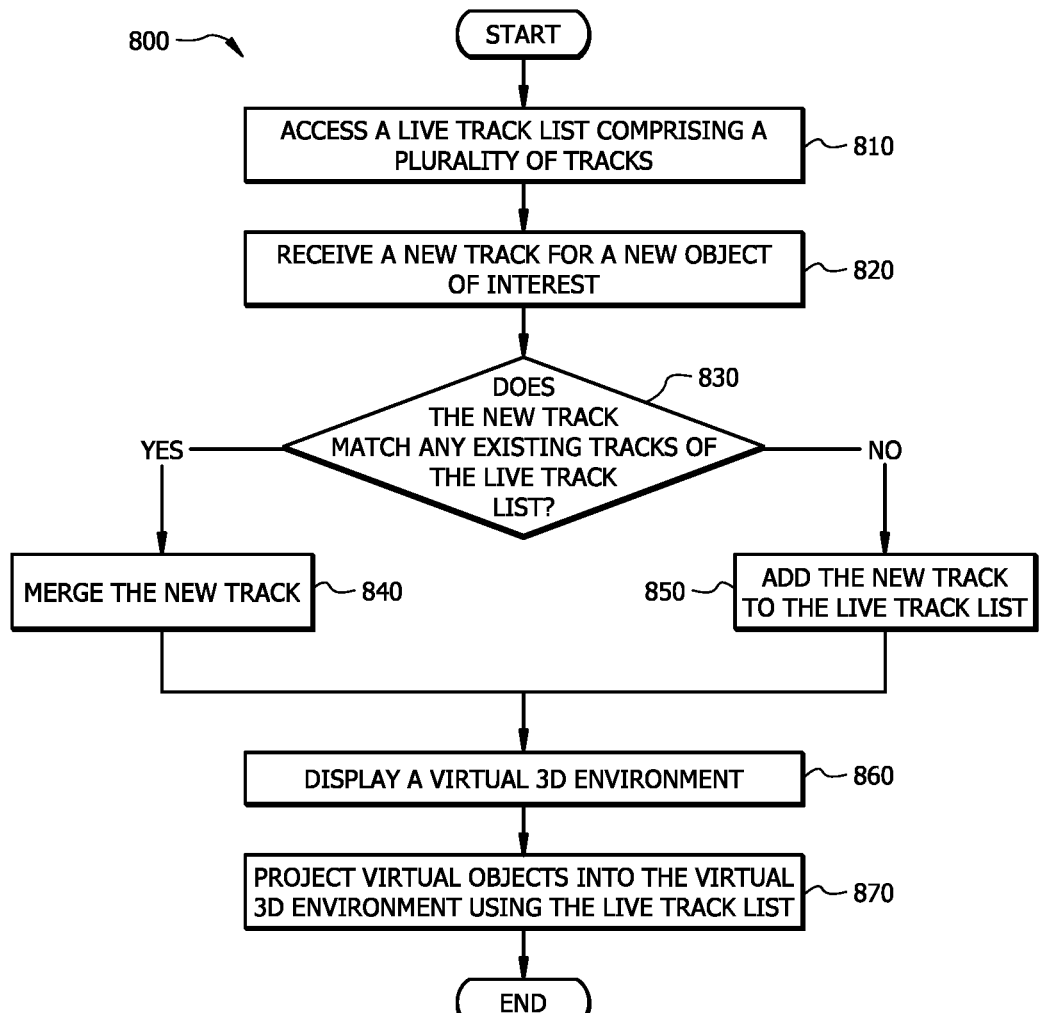
FIG. 8 is a flow diagram illustrating an example method for 3D spatial tracking, according to particular embodiments.

FIG. 8 is a flow diagram illustrating an example method 800 for 3D spatial tracking. In general, method 800 may be performed by 3D spatial tracking module 190 of computing system 110 in order to track objects in virtual 3D environment 131. Method 800 begins in step 810 where method 800 accesses a live track list stored in one or more memory units. In some embodiments, the live track list includes a plurality of tracks. Each track of the plurality of tracks includes a coordinate (e.g., a 2D or 3D coordinate) of an object of interest captured by a physical sensor located within a physical environment and a unique identification (ID) for the detected object of interest. In some embodiments, the physical sensor is physical sensor 120 and the physical environment is physical environment 130.

In step 820, method 800 receives a new track for a new object of interest. The new track includes a coordinate (e.g., a 2D or 3D coordinate) of the new track and a unique ID for the new object of interest. The new track may be received after the object of interest is detected in images such as images 125.

In step 830, method 800 compares the new track to the plurality of tracks of the live track list in order to determine if the new track matches any existing tracks of the plurality of tracks. If method 800 determines in step 830 that the new track matches a particular existing track in the live track list, method 800 proceeds to step 840 where the new track is merged with the particular existing track in the live track list. If method 800 determines in step 830 that the new track does not match any existing tracks in the live track list, method adds the new track to the live track list in step 850.

In some embodiments of step 830, method 800 determines if the unique ID for the new object of interest matches any unique IDs in the live track list. In some embodiments of step 830, method 800 determines if a 3D position of the new object of interest matches any 3D positions of any of the plurality of tracks of the live track list. In some embodiments of step 830, method 800 determines if a velocity of the new object of interest matches any velocities of any of the plurality of tracks of the live track list. In some embodiments of step 830, method 800 determines if an appearance of the new object of interest matches the appearances of any of the plurality of tracks of the live track list. If some or all of the unique ID, the 3D position, the velocity, and the appearances match, method 800 determines that the new track matches an existing track of the plurality of tracks of the live track list.

In step 860, method 800 displays, in a graphical user interface, a virtual three-dimensional (3D) environment that corresponds to the physical environment. In some embodiments, the graphical user interface is graphical user interface 162. In some embodiments, the virtual 3D environment is virtual 3D environment 131. In step 870, method 800 projects virtual objects into the virtual 3D environment using the live track list. In some embodiments, the virtual objects are virtual objects 141. After step 870, method 800 may end.

In some embodiments, method 800 may perform additional steps of removing tracks from the live track list. For example, method 800 may determine a lifespan for each of the plurality of tracks of the live track list. If the determined lifespan for a particular track of the plurality of tracks has expired, method 800 may remove the particular track from the live track list.

Figure 9:
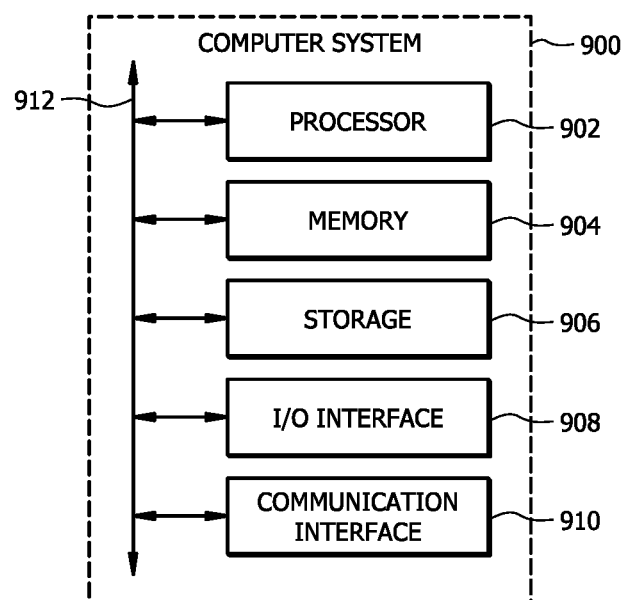
FIG. 9 is an example computer system that can be utilized to implement aspects of the various technologies presented herein, according to particular embodiments.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after e9ecution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. A system comprising:
   one or more memory units; and
   one or more computer processors communicatively coupled to the one or more memory units and configured to:
   access a video generated by a first physical camera located within a physical environment;
   identify, by analyzing a video frame of the video, an object of interest in the video frame, the object of interest corresponding to a physical object that is physically located within the physical environment;
   display, in a graphical user interface, a virtual three-dimensional (3D) environment that corresponds to the physical environment, the virtual 3D environment comprising:
   a first virtual camera that corresponds to the first physical camera; and
   a second virtual camera that corresponds to a second physical camera located within the physical environment;
   access, from a calibrations database, a plurality of settings of the first physical camera and a plurality of settings of the second physical camera;
   configure a plurality of settings of the first virtual camera to match the plurality of settings of the first physical camera such that a field of view of the first virtual camera in the virtual 3D environment is identical to a field of view of the first physical camera in the physical environment;
   configure a plurality of settings of the second virtual camera to match the plurality of settings of the second physical camera such that a field of view of the second virtual camera in the virtual 3D environment is identical to a field of view of the second physical camera in the physical environment; and
   project the identified object of interest into the virtual 3D environment using the configured first and second virtual cameras.

2. The system of claim 1, the one or more memory units are further configured to:
create a first synthetic depth map for the first virtual camera, wherein the first synthetic depth map provides a one-to-one mapping of each 2D pixel created by the first physical camera and a corresponding space of the first virtual camera in the virtual 3D environment; and
create a second synthetic depth map for the second virtual camera, wherein the second synthetic depth map provides a one-to-one mapping of each 2D pixel created by the second physical camera and a corresponding space of the second virtual camera in the virtual 3D environment;
create a camera matrix comprising the first and second synthetic depth maps.

3. The system of claim 2, wherein projecting the identified object of interest into the virtual 3D environment comprises:
determining a 2D coordinate of the identified object of interest; and
converting the 2D coordinate to a location within the virtual 3D environment using the camera matrix.

4. The system of claim 2, wherein the camera matrix enables the first and second physical cameras to be aware of detection capabilities of other physical cameras using a shared unified coordinate system.

5. The system of claim 1, wherein identifying the object of interest comprises utilizing a convolution neural network architecture.

6. The system of claim 1, wherein:
the first virtual camera is placed in the virtual 3D environment at a same latitude, longitude, and altitude as the first physical camera is positioned in the physical environment; and
the second virtual camera is placed in the virtual 3D environment at a same latitude, longitude, and altitude as the second physical camera is positioned in the physical environment.

7. The system of claim 1, wherein the settings of the first and second virtual cameras and the first and second physical cameras each comprise:
a surge setting;
a sway setting;
a heave setting;
a roll setting;
a pitch setting; and
a yaw setting.

8. The system of claim 7, wherein the settings of the first and second virtual cameras and the first and second physical cameras further comprise:
a radial distortion; and
a tangential distortion.

9. A method by a computing system, the method comprising:
accessing a video generated by a first physical camera located within a physical environment;
identifying, by analyzing a video frame of the video, an object of interest in the video frame, the object of interest corresponding to a physical object that is physically located within the physical environment;
displaying, in a graphical user interface, a virtual three-dimensional (3D) environment that corresponds to the physical environment, the virtual 3D environment comprising:
a first virtual camera that corresponds to the first physical camera; and
a second virtual camera that corresponds to a second physical camera located within the physical environment;
accessing, from a calibrations database, a plurality of settings of the first physical camera and a plurality of settings of the second physical camera;
configuring a plurality of settings of the first virtual camera to match the plurality of settings of the first physical camera such that a field of view of the first virtual camera in the virtual 3D environment corresponds to a field of view of the first physical camera in the physical environment;
configuring a plurality of settings of the second virtual camera to match the plurality of settings of the second physical camera such that a field of view of the second virtual camera in the virtual 3D environment corresponds to a field of view of the second physical camera in the physical environment; and
projecting the identified object of interest into the virtual 3D environment using the configured first and second virtual cameras.

10. The method of claim 9, further comprising:
creating a first synthetic depth map for the first virtual camera, wherein the first synthetic depth map provides a one-to-one mapping of each 2D pixel created by the first physical camera and a corresponding space of the first virtual camera in the virtual 3D environment;
creating a second synthetic depth map for the second virtual camera, wherein the second synthetic depth map provides a one-to-one mapping of each 2D pixel created by the second physical camera and a corresponding space of the second virtual camera in the virtual 3D environment; and
creating a camera matrix comprising the first and second synthetic depth maps.

11. The method of claim 10, wherein projecting the identified object of interest into the virtual 3D environment comprises:
determining a 2D coordinate of the identified object of interest; and
converting the 2D coordinate to a location within the virtual 3D environment using the camera matrix.

12. The method of claim 9, wherein identifying the object of interest comprises utilizing a convolution neural network architecture.

13. The method of claim 9, wherein:
the first virtual camera is placed in the virtual 3D environment at a same latitude, longitude, and altitude as the first physical camera is positioned in the physical environment; and
the second virtual camera is placed in the virtual 3D environment at a same latitude, longitude, and altitude as the second physical camera is positioned in the physical environment.

14. The method of claim 9, wherein the settings of the first and second virtual cameras and the first and second physical cameras each comprise:
a surge setting;
a sway setting;
a heave setting;
a roll setting;
a pitch setting; and
a yaw setting.

15. The method of claim 14, wherein the settings of the first and second virtual cameras and the first and second physical cameras further comprise:
- a radial distortion; and
- a tangential distortion.

16. One or more computer-readable non-transitory storage media embodying instructions that, when executed by a processor, cause the processor to perform operations comprising:
- accessing a video generated by a first physical camera located within a physical environment;
- identifying, by analyzing a video frame of the video, an object of interest in the video frame, the object of interest corresponding to a physical object that is physically located within the physical environment;
- displaying, in a graphical user interface, a virtual three-dimensional (3D) environment that corresponds to the physical environment, the virtual 3D environment comprising:
  - a first virtual camera that corresponds to the first physical camera; and
  - a second virtual camera that corresponds to a second physical camera located within the physical environment;
- accessing, from a calibrations database, a plurality of settings of the first physical camera and a plurality of settings of the second physical camera;
- configuring a plurality of settings of the first virtual camera to match the plurality of settings of the first physical camera such that a field of view of the first virtual camera in the virtual 3D environment corresponds to a field of view of the first physical camera in the physical environment;
- configuring a plurality of settings of the second virtual camera to match the plurality of settings of the second physical camera such that a field of view of the second virtual camera in the virtual 3D environment corresponds to a field of view of the second physical camera in the physical environment; and
- projecting the identified object of interest into the virtual 3D environment using the configured first and second virtual cameras.

17. The one or more computer-readable non-transitory storage media of claim 15, the operations further comprising:
- creating a first synthetic depth map for the first virtual camera, wherein the first synthetic depth map provides a one-to-one mapping of each 2D pixel created by the first physical camera and a corresponding space of the first virtual camera in the virtual 3D environment;
- creating a second synthetic depth map for the second virtual camera, wherein the second synthetic depth map provides a one-to-one mapping of each 2D pixel created by the second physical camera and a corresponding space of the second virtual camera in the virtual 3D environment; and
- creating a camera matrix comprising the first and second synthetic depth maps.

18. The one or more computer-readable non-transitory storage media of claim 17, wherein projecting the identified object of interest into the virtual 3D environment comprises:
- determining a 2D coordinate of the identified object of interest; and
- converting the 2D coordinate to a location within the virtual 3D environment using the camera matrix.

19. The one or more computer-readable non-transitory storage media of claim 15, wherein:
- the first virtual camera is placed in the virtual 3D environment at a same latitude, longitude, and altitude as the first physical camera is positioned in the physical environment; and
- the second virtual camera is placed in the virtual 3D environment at a same latitude, longitude, and altitude as the second physical camera is positioned in the physical environment.

20. The one or more computer-readable non-transitory storage media of claim 15, wherein the settings of the first and second virtual cameras and the first and second physical cameras each comprise:
- a surge setting;
- a sway setting;
- a heave setting;
- a roll setting;
- a pitch setting;
- a yaw setting;
- a radial distortion; and
- a tangential distortion.

* * * * *